(12) United States Patent
Boulakhov et al.

(10) Patent No.: US 10,751,813 B2
(45) Date of Patent: Aug. 25, 2020

(54) SOLID END MILL WITH COMPLEX CLEARANCE SURFACE

(71) Applicant: Hanita Metal Works Ltd., Shlomi (IL)

(72) Inventors: Sergei Boulakhov, Shlomi (IL); Leonid Sharivker, Shlomi (IL)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/111,828

(22) Filed: Aug. 24, 2018

(65) Prior Publication Data

US 2019/0061021 A1   Feb. 28, 2019

(30) Foreign Application Priority Data

Aug. 27, 2017   (IL) .......................................... 254172

(51) Int. Cl.
*B23C 5/10* (2006.01)
*B23C 5/06* (2006.01)

(52) U.S. Cl.
CPC .................. *B23C 5/06* (2013.01); *B23C 5/10* (2013.01); *B23C 2210/0414* (2013.01); *B23C 2250/16* (2013.01)

(58) Field of Classification Search
CPC ...... B23C 2210/088; B23C 2210/0414; B23C 2250/16; B23C 5/06; B23C 5/10; Y10T 409/304312; Y10T 407/1948; Y10T 407/1962
See application file for complete search history.

(56) References Cited

U.S. PATENT DOCUMENTS

| | | | |
|---|---|---|---|
| 4,212,568 A | 7/1980 | Minicozzi | |
| 4,285,618 A | 8/1981 | Shanley, Jr. | |
| 4,560,308 A | 12/1985 | Deller | |
| 4,721,421 A * | 1/1988 | Klinger | B23C 5/10 407/116 |
| 4,740,121 A | 4/1988 | Arnold | |
| 4,770,567 A | 9/1988 | Moriarty | |
| 4,963,059 A | 10/1990 | Hiyama | |
| 5,779,399 A | 7/1998 | Kuberski | |
| 5,908,269 A | 6/1999 | Cox | |
| 6,065,905 A | 5/2000 | Kinton | |
| 6,379,090 B1 | 4/2002 | Halley et al. | |
| 6,997,651 B2 | 2/2006 | Kawai et al. | |
| 7,207,752 B2 | 4/2007 | Schulte | |

(Continued)

FOREIGN PATENT DOCUMENTS

| | | |
|---|---|---|
| CH | 701414 A1 | 1/2011 |
| CN | 1034881 | 8/1989 |

(Continued)

OTHER PUBLICATIONS

Oct. 15, 2018 Foreign OA.

(Continued)

*Primary Examiner* — Sara Addisu
(74) *Attorney, Agent, or Firm* — Larry R. Meenan

(57) ABSTRACT

In one aspect, rotary cutting tools are described comprising clearances with projections adjacent the cutting edge and extending the width and length of the clearance surface of each tooth. This design can assist in reducing vibration or chatter during cutting operations.

16 Claims, 5 Drawing Sheets

(56) References Cited

U.S. PATENT DOCUMENTS

| | | | | |
|---|---|---|---|---|
| 7,214,006 B2* | 5/2007 | Flynn | ..................... | B23C 5/10 407/53 |
| 7,223,053 B2* | 5/2007 | Flynn | ..................... | B23C 5/10 407/53 |
| 7,306,408 B2 | 12/2007 | Wells et al. | | |
| 7,544,021 B2* | 6/2009 | Flynn | ..................... | B23C 5/003 407/54 |
| 8,366,354 B2 | 2/2013 | Davis | | |
| 2004/0120777 A1 | 6/2004 | Noland | | |
| 2007/0098506 A1 | 5/2007 | Flynn | | |
| 2007/0248422 A1 | 10/2007 | Song | | |
| 2008/0101877 A1* | 5/2008 | Engin | ..................... | B23C 3/18 407/30 |
| 2008/0206003 A1 | 8/2008 | Flynn | | |
| 2010/0209201 A1* | 8/2010 | Davis | ..................... | B23C 5/10 407/60 |
| 2010/0215447 A1 | 8/2010 | Davis | | |
| 2015/0258616 A1* | 9/2015 | Stanbach | ................ | B23C 5/10 407/54 |
| 2016/0082526 A1* | 3/2016 | Swift | ..................... | B23C 5/28 407/11 |
| 2016/0256939 A1* | 9/2016 | Miyamoto | ............... | B23C 5/10 |

FOREIGN PATENT DOCUMENTS

| | | |
|---|---|---|
| CN | 101085474 A | 12/2007 |
| CN | 101326026 | 3/2011 |
| DE | 3805727 C2 | 7/1991 |
| DE | 202006016531 | 7/2007 |
| DE | 102015218511 A1 | 3/2016 |
| GB | 1285076 | 8/1972 |
| JP | 02256412 | 10/1990 |
| JP | 8168915 | 7/1996 |
| JP | 08507724 | 8/1996 |
| JP | 2001054812 | 2/2001 |
| JP | 2001121340 | 5/2001 |
| JP | 3304116 | 7/2002 |
| JP | 2002273612 | 9/2002 |
| JP | 5754019 B2 | 7/2015 |
| WO | WO2007123326 A1 | 11/2007 |

OTHER PUBLICATIONS

Apr. 29 2015 Office action (1 month) CN102325619A.
Jun. 16, 2017 Final Office Action.
Dec. 16, 2016 Office action (3 months).
Jul. 27, 2015 First office action CN103769662A.
Feb. 26, 2019 Non-Final OA.
Jan. 20, 2019 Foreign OA.
May 6, 2019 Foreign OA.
Aug. 22, 2010 Final OA.

* cited by examiner

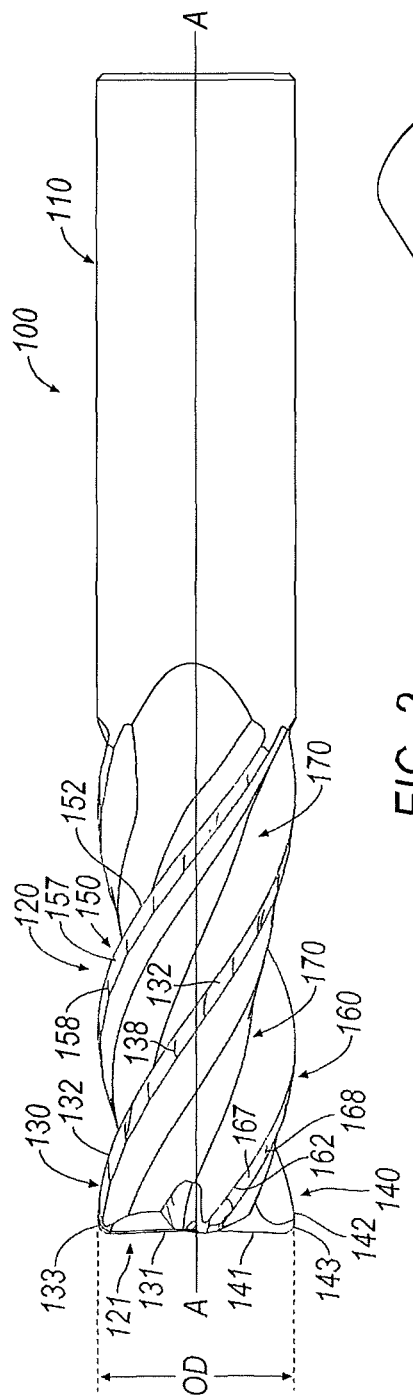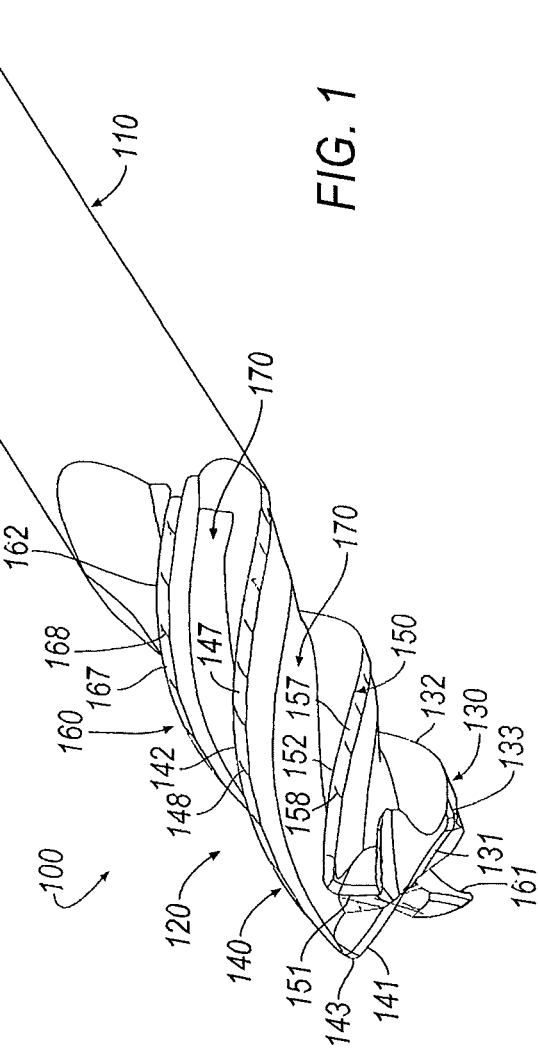

SOLID END MILL WITH COMPLEX CLEARANCE SURFACE

RELATED APPLICATION DATA

The present application claims priority pursuant to 35 U.S.C. § 119(a) to Israel Patent Application No. 254172 filed Aug. 27, 2017, which is incorporated herein by reference in its entirety.

FIELD

The invention relates to end mills and, in particular to solid end mills with a complex clearance surface comprising projections adjacent the cutting edge and extending the entire width and length of the clearance surface.

BACKGROUND

Solid end mills, especially with cutting diameters equal and larger than 12 mm, implemented with currently well-known straight and eccentric clearances (or combination of both), when applied to cutting metals, tend to generate, sometimes considerable, vibrations (or chatter). Suppressing vibrations is one of most essential requirements to any solid end mill. Therefore, there is a huge effort to develop and pro-duce special geometry features helping to reduce or eliminate chatter.

By implementing end mills with an unequal index, deferential helix angles, veritable helix angles, and the like, the problem partially gets solved. For example, some of these features might work well for titanium alloys, but does not suppress vibrations in stainless steels, or other materials. In addition, some combinations of these features provide an acceptable solution for cutting diameters up to 12 mm, but vibrations still exist at larger cutting diameters.

The so-called "micro land" is the currently existing solution to suppress vibrations for solid end mills with a cutting diameter larger than 12 mm, which is produced by grinding a tiny clearance facet of 0.05-0.1 mm width and with an angle of between 1.5-3°. The clearance facet must be ground adjacent the cutting edge. Along with high accuracy needed for grinding the land width and angles, the "micro land" requires, at least two cleanses (i.e., minimum 2 passes) on each tooth, and probably three cleanses for each tooth.

Another problem is that cutters with the "micro-land" consume considerably larger spindle power vs. cutters without the "micro-land." In fact, there is an increase in specific energy, which in turn produces larger hit generation during milling, which in turn creates additional difficulties in applying cutters with the "micro-land" to cut high temperature alloys. In view of the foregoing, improved end mills are de-sired that provide one or more advantages over conventional designs.

SUMMARY

The problem of reducing vibration (or chatter) in a solid end mill for any cutting diameter is solved by providing a solid end mill having a clearance with projections adjacent the cutting edge and extending the entire width and length of the clearance surface of each tooth.

In one aspect of the invention, an elongated rotary cutting tool, such as a solid end mill, defines a central longitudinal axis and includes a shank portion and a cutting portion adjoining the shank portion. The cutting portion has a cutting end and a first blade. The first blade has an end cutting edge, a peripheral cutting edge and a complex clearance surface adjacent the peripheral cutting edge. The complex clearance surface includes a plurality of projections for reducing vibration or chatter in a rotary cutting tool. In one embodiment, the rotary cutting tool includes a plurality of blades.

BRIEF DESCRIPTION OF THE DRAWINGS

While various embodiments of the invention are illustrated, the particular embodiments shown should not be construed to limit the claims.

It is anticipated that various changes and modifications may be made without departing from the scope of this invention.

FIG. 1 is an isometric view of a rotary cutting tool, such as a solid end mill, having a complex clearance surface with projections according to an embodiment of the invention;

FIG. 2 is a side view of the rotary cutting tool of FIG. 1 rotated about one-quarter turn in a counter-clockwise direction;

DETAILED DESCRIPTION OF THE INVENTION

Figure 3:
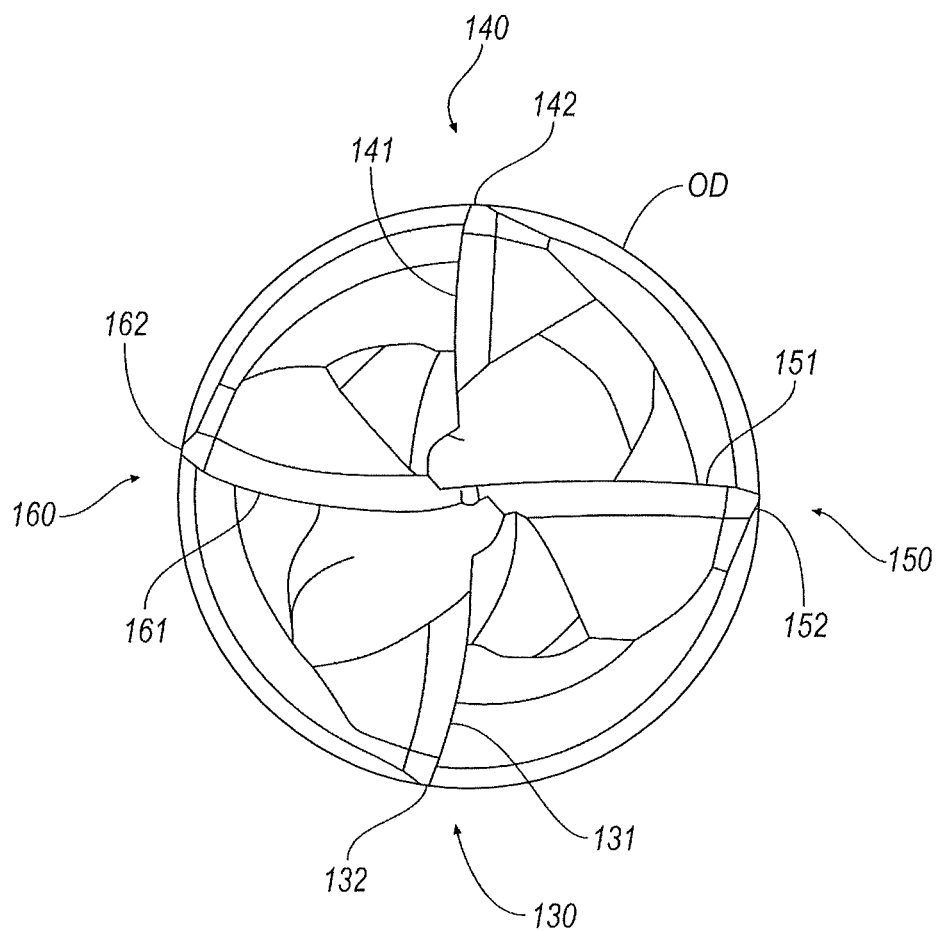
FIG. 3 is an end view of the rotary cutting tool of FIG. 1.

A rotary cutting tool 100, for example, a solid end mill, is shown in FIGS. 1-5 according to an embodiment of the invention. Although a solid end mill 10 is shown in the illustrated embodiment, the principles of the invention described below can be applied to other rotary cutting tools, such as solid drills, taps, reamers, and the like. The solid end mill 100 defines a central longitudinal axis, A-A, and comprises a shank portion 110 for securing in a chuck or arbor of a machine tool (not shown) and a cutting portion 120 adjoining the shank portion 110.

The cutting portion 120 has a cutting end 121 and at least a first blade 130. The first blade 130 has an end cutting edge 131 and a peripheral cutting edge 132. The end cutting edge 131 of the first blade 130 ex-tends from an outer diameter, OD, of the cutting portion 120 towards the central longitudinal axis, A-A. The end cutting edge 131 of the first blade 130 defines a first dish profile and a first axial profile. A "dish profile," as described herein, refers to the profile or shape of an end cutting portion of a blade when viewed a side of the solid end mill 100, as in FIG. 1. An "axial profile," as described herein, refers to the profile of the end cutting portion of a blade when viewed from an end, as in FIG. 3. In the illustrated embodiment, the first blade 130 extends less than the full distance from the outer diameter, OD, to the central longitudinal axis, A-A. However, it will be appreciated that in an al-ternate embodiment, the first blade 130 can extend from the outer diameter, OD, to the central longitudinal axis, A-A.

Embodiments of rotary cutting tool 100 described herein are not limited to a single blade. One of skill in the art would readily understand that rotary cutting tools consistent with the present invention may include any number of blades. For example, in some embodiments, a rotary cutting tool 100 further comprises a second blade 140. The second blade 140 is disposed opposite the first blade 130 on the cutting portion 120 and has an end cutting edge 141 and a continuously smooth, uninterrupted peripheral cutting edge 142. The end cutting edge 141 of the second blade 140 extends from the outer diameter, OD, of the cutting portion 120 towards the central longitudinal axis, A-A. The end cutting edge 141 of the second blade 140 defines a second dish profile and a second axial profile. In some embodiments, the second dish profile is curved.

In embodiments having two or more blades, various configurations and architectures of the first blade 130 and the second blade 140 are possible within the scope of the present invention. For example, in some embodiments, the first dish profile and the second dish profile are reflectively symmetric. Further, in some embodiments, the first dish profile and the second dish profile together form a convex curve. Alternatively, in some embodiments, the first dish profile and the second dish profile together form a concave curve. It is to be understood that such arrangements in which opposite dish profiles, when together, may form a concave or convex dish overall, that a dish profile of individual teeth or cutting edges is to be convex. In any of such arrangements, a radially innermost portion of dish profiles described herein is axially rearward of at least one other point along the same dish profile. Such an arrangement permits the necessary clearance at the radially innermost portion (or, in some cases, the center of the end face of the tool) such that cutting tools described herein are capable of ramping operations.

In some embodiments, the first axial profile and the second profile are rotationally asymmetric. One such embodiment is illustrated in FIG. 3. Alternatively, in some embodiments, the first axial profile and the second axial profile are rotationally symmetric. It is to be understood that in such embodiments, the first dish profile and the second dish profile are still reflectively symmetric.

As discussed above, the rotary cutting tool 100 described herein may have any number of blades. For example, in some embodiments, the rotary cutting tool 100 further comprises a third blade 150 between the first blade 130 and the second blade 140. The third blade 150 has an end cutting edge 151 and a peripheral cutting edge 152. The end cut-ting edge 151 of the third blade 150 extends from the outer diameter, OD, of the cutting portion 120 towards the central longitudinal axis, A-A. The end cutting edge 151 of the third blade 150 defines a third dish profile and a third axial profile, wherein the third dish profile is curved. In some such embodiments, the third axial profile is rotation-ally asymmetric with at least one of the first axial profile and the second axial profile. Alternatively, in some embodiments, the third axial profile is rotationally symmetric to at least one of the first axial profile and the second axial profile. One such embodiment is illustrated in FIG. 3.

Further, in some embodiments, the rotary cutting tool 100 further comprises a fourth blade 160, the fourth blade 160 being disposed opposite the third blade 150 and having an end cutting edge 161 and a peripheral cutting edge 162. The end cutting edge 161 of the fourth blade 160 extends from the outer diameter, OD, of the cutting portion 120 towards the central longitudinal axis, A-A, the end cutting edge 161 of the fourth blade 160 defining a fourth dish profile and a fourth axial profile. The fourth dish profile is curved. In some such embodiments, the third dish profile and the fourth dish profile are reflectively symmetric.

In some embodiment, the first blade 130 defines a rounded corner cut-ting edge 133 connecting the end cutting edge 131 and the peripheral cutting edge 132 of the first blade 130, the rounded corner cutting edge 133 defining a rounded corner radius. It will be appreciated that the invention can be practiced with other types of corner cutting edges. For example, the corner cutting edge can be chamfered corner cutting edge, a sharp corner cutting edge, and the like.

Similarly, the second blade 140 defines a rounded corner cutting edge 143 connecting the end cutting edge 141 and the peripheral cutting edge 142 of the second blade 140, the rounded corner cutting edge 143 defining a rounded corner radius. It will be appreciated that the invention can be practiced with other types of corner cutting edges. For example, the corner cutting edge can be chamfered corner cutting edge, a sharp corner cutting edge, a ball nose, and the like.

Figure 4:
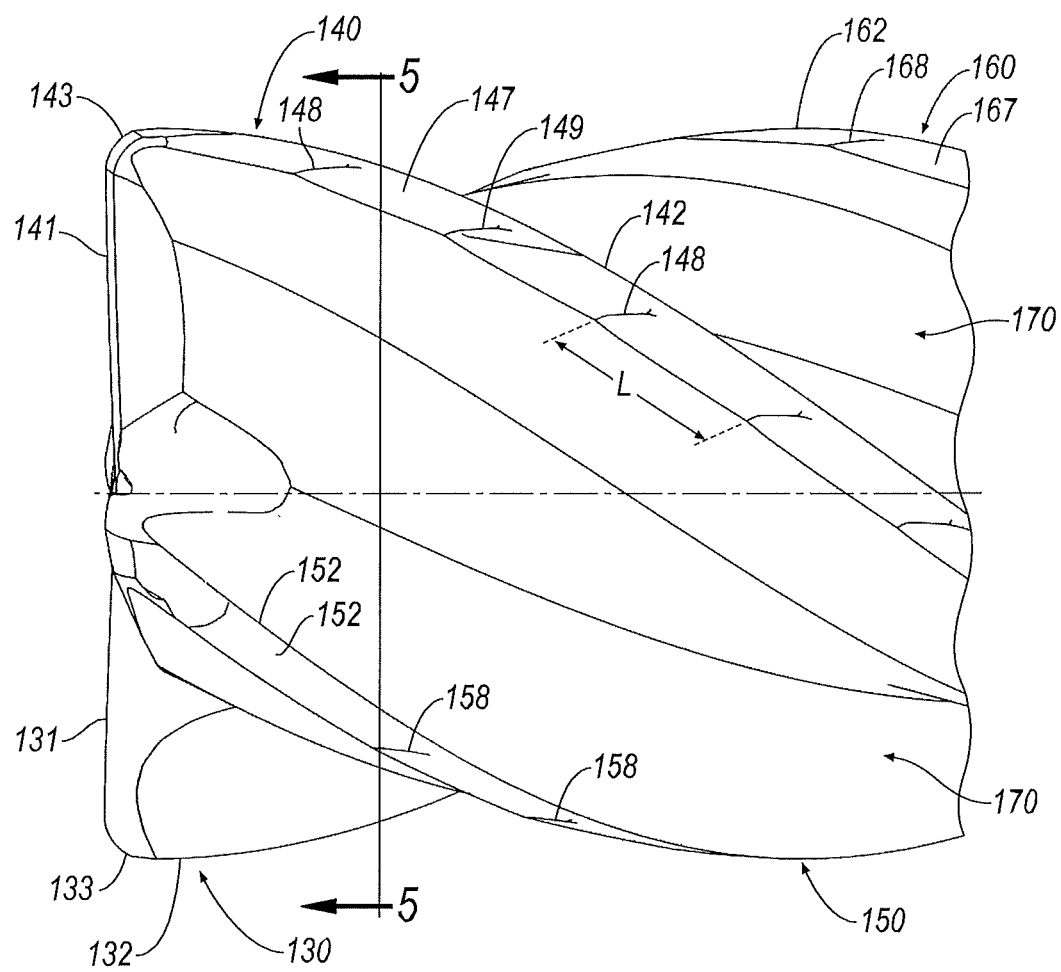
FIG. 4 is an enlarged side view of cutting end of the rotary cutting tool of FIG. 1.
Figure 5:
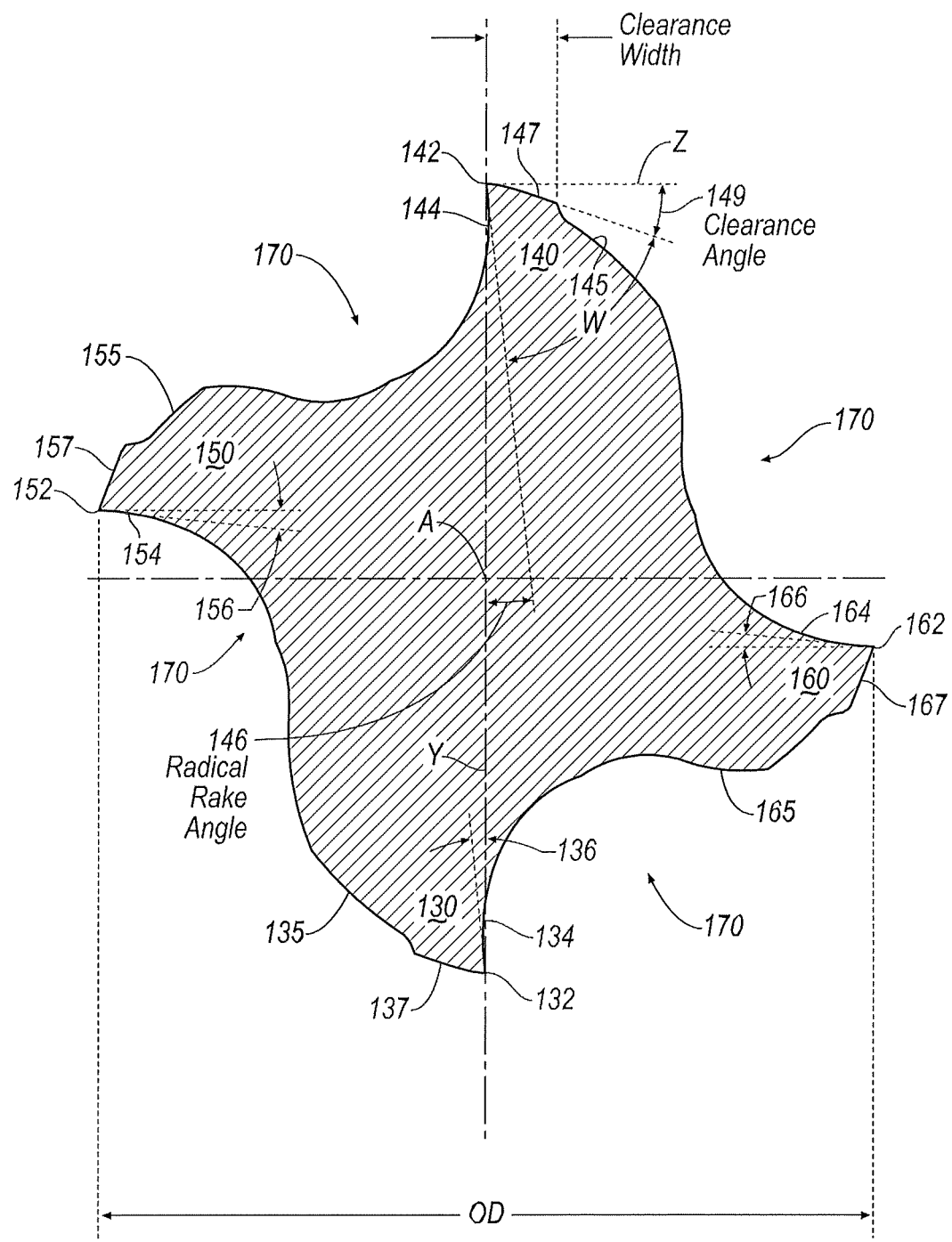
FIG. 5 is an enlarged cross-sectional of the cutting end of the rotary cutting tool taken along line 5-5 of FIG. 4.

Referring now to FIGS. 4 and 5, each blade 130, 140, 150, 160 is separated by a helical flute 170 extending axially rearward from the cutting end 121 of the cutting head 120. The number of flutes 170 is equal to the number of blades. In the illustrated embodiment, the cutting head 120 has a total of four (15) flutes 170. However, it will be appreciated that the invention can be practiced with any desirable number of flutes 170, depending on the dimensions of the rotary cutting tool 100. For example, a rotary cutting tool 100 having a relatively large outer diameter, OD, has the capability of having a greater number of flutes than a milling cutter with a relatively smaller outer diameter, OD, and vice versa. Thus, the rotary cutting tool 100 can have as few as one flute 170 to as many as thirty or more flutes 170, and an outer diameter, OD, between about 6 mm and about 35 mm.

As shown in FIG. 5, the peripheral cutting edge 132, 142, 152, 162 of each blade 130, 140, 150, 160 has a leading face and a trailing face. For purposes of brevity, only the blade 140 will be discussed below. The peripheral cutting edge 142 of the blade 140 has a leading face 144 and a trailing face 145. The leading face 144 faces the direction of rotation of the rotary cutting tool 100 when in use. The peripheral cut-ting edge 142 of the blade 140 lies on the circumference of the outer diameter, OD. The leading face 144 has a positive radial rake angle 146. The radial rake angle 146 is the angle that the inclined leading face 144 makes with a radial line Y, as shown in FIG. 5, extending from the central longitudinal axis, A-A, to the peripheral cutting edge 142 of the blade 140. In one embodiment, the angle 146 is in a range between about −15 degrees to about +15 degrees, depending on the material being cut, and a radial rake angle 146 equal to zero degrees may be required for some materials.

One aspect of the invention is that each blade 130, 140, 150, 160 also has a substantially planar, complex clearance surface 137, 147, 157, 167. For purpose of brevity, only the blade 140 and complex clearance surface 147 will be discussed herein. The complex clearance surface 147, also commonly known as a land surface, extends rearward from the peripheral cutting edge 142 of the blade 140. As shown in FIG. 4, the complex clearance surface 147 is inclined at an angle to a tangent, Z, extending from the peripheral cutting edge 142 of the blade 140. This angle is referred to as the primary clearance angle 149. It will be appreciated that the other blades 130, 150, 160 also include varying primary clearance angles, and only the primary clearance angle 149 is discussed herein for brevity.

In the illustrated embodiment, the complex clearance surface comprises a continuously varying primary clearance angle along the entire length of the blade 140. The result of the continuously varying primary clearance angle is a sinusoidal wave pattern along the entire length of the blade 140. It is noted that the complex clearance surface 147 does not affect the continuously smooth, uninterrupted peripheral cutting edge 142.

As mentioned above, the primary clearance angle 149 continuously varies along the complex clearance surface 147. Specifically, the primary clearance angle 149 has a minimum value in a range between about 1 degree to about 5 degrees and a maximum value in a range between about 6 degrees to about 11 degrees, and then repeats along the entire length of the blade 140, thereby defining a sinusoidal wave pattern having a plurality of peaks and valleys. The sinusoidal wave pattern defines a plurality of raised areas or bumps 148 located at the peaks in which the primary clearance angle 149 is at the minimum value. In one embodiment, the sinusoidal wave pattern formed by the continuously varying primary clearance angle 149 has a pitch, L, of between about 1 mm to about 6 mm. However, it will be appreciated that the invention is not limited by the magnitude of the pitch, L, and that the invention can be practiced with any desirable pitch, L, depending on the geometry of the complex clearance surface 147. In the illustrated embodiment, the complex clearance surface 147 is substantially planar. In an alternate embodiment, the complex clearance surface 147 is not substantially planar, but is eccentric or convex, providing more material, and hence greater strength for the blade 140.

Figure 6:
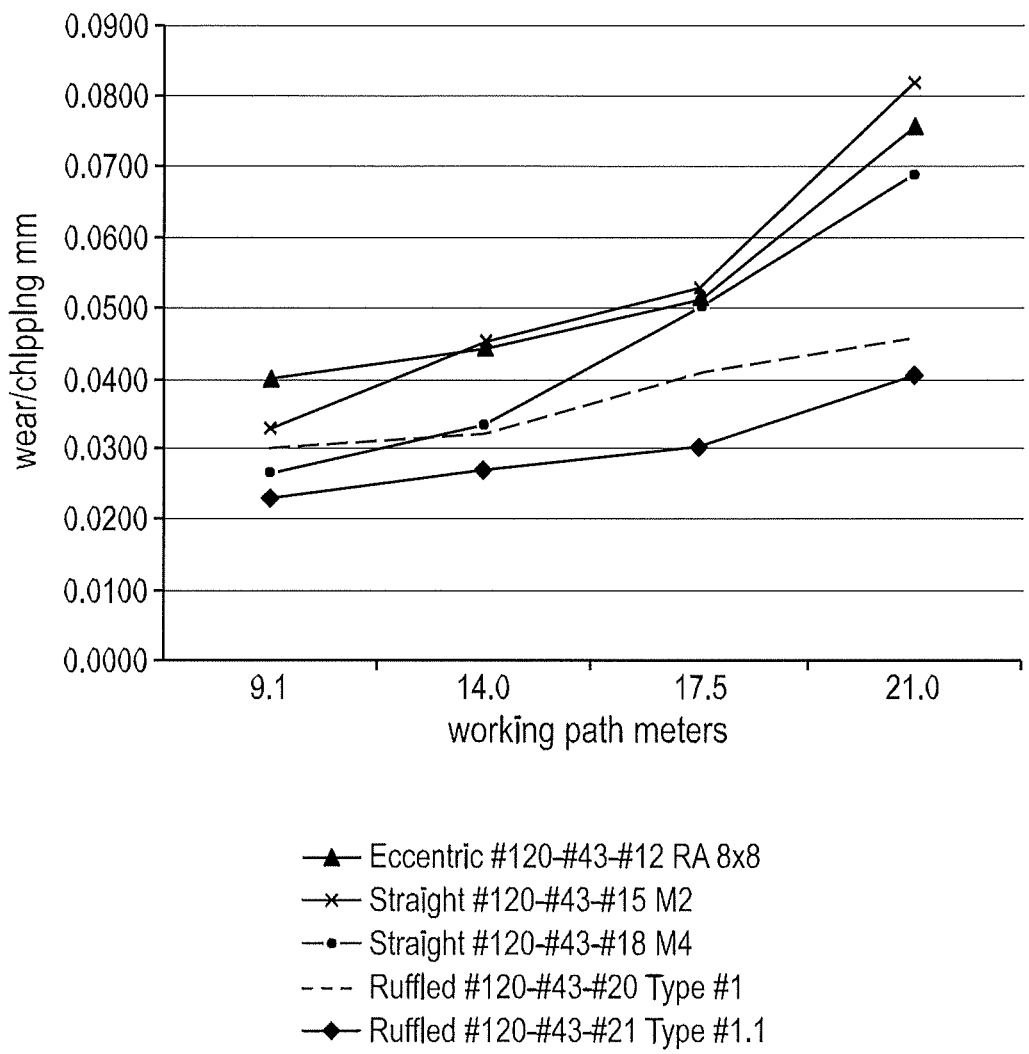
FIG. 6 is a graph showing working path versus wear/chipping of the rotary cutting tool of the invention versus conventional "micro-land" cutting tools.

As shown in FIG. 6, tests were conducted to study the vibration damping capabilities of the rotary cutting tool 100 of the invention with the complex clearance surface as compared to conventional rotary cutting tools with straight or eccentric "micro-land" clearance surfaces. The tests were conducted in Stainless Steel 316L and Carbon Steel 4340.

In FIG. 6, the rotary tool 100 of the invention is represented by the dashes and diamonds, and the conventional rotary cutting tool is represented by the triangle, X and cross). The results show that the rotary cutting tool 100 demonstrated very good vibration damping capabilities, long tool life and a total spindle load reduction of about 10% vs. straight or eccentric conventional "micro-land" rotary cutting tools.

The patents and publications referred to herein are hereby incorporated by reference. Having described presently preferred embodiments the invention may be otherwise embodied within the scope of the appended claims.

The invention claimed is:

1. An elongated rotary cutting tool defining a central longitudinal axis (A-A), comprising:
    a shank portion; and
    a cutting portion adjoining the shank portion, the cutting portion having a cutting end and a first blade, the first blade having an end cutting edge, a peripheral cutting edge and a complex clearance surface adjacent the peripheral cutting edge,
    wherein the complex clearance surface:
        reduces vibration or chatter in the rotary cutting tool, and
        comprises a continuously varying primary clearance angle with respect to a tangent, Z, extending from the peripheral cutting edge of the blade,
        the continuously varying primary clearance angle defining a sinusoidal wave pattern having a plurality of peaks and valleys, and
    wherein the peripheral cutting edge is continuously smooth and uninterrupted.

2. The rotary cutting tool of claim 1, wherein the sinusoidal wave pattern has a pitch, L, of between about 1 mm and about 6 mm.

3. The rotary cutting tool of claim 1, wherein the sinusoidal wave pattern has a minimum value in a range between about 1 degree to about 5 degrees and a maximum value in a range between about 6 degrees to about 11 degrees, and then repeats along an entire length of the blade.

4. The rotary cutting tool of claim 1, wherein the sinusoidal wave pattern defines a plurality of raised areas or bumps located at the peaks.

5. The rotary cutting tool of claim 1, wherein the first blade defines a rounded corner cutting edge connecting the end cutting edge and the peripheral cutting edge, the rounded corner cutting edge defining a rounded corner radius.

6. The rotary cutting tool of claim 1, further comprising a plurality of blades.

7. The rotary cutting tool of claim 6, wherein each blade is separated by a helical flute extending axially rearward from the cutting end of the cutting head.

8. The rotary cutting tool of claim 3, wherein the peripheral cutting edge of each blade has a leading face and a trailing face.

9. The rotary cutting tool of claim 8, wherein the leading face of each blade has a radial rake angle in a range between −15 degrees to +15 degrees.

10. The rotary cutting tool of claim 1, wherein the complex clearance surface is planar.

11. The rotary cutting tool of claim 1, wherein the complex clearance surface is eccentric or convex.

12. The rotary cutting tool of claim 1, wherein the rotary cutting tool comprises a solid end mill.

13. The rotary cutting tool of claim 1, wherein:
    the cutting portion has an outer diameter; and
    the peripheral cutting edge lies at a circumference defined by the outer diameter.

14. The rotary cutting tool of claim 13, wherein the complex clearance surface does not affect the continuously smooth, uninterrupted peripheral cutting edge.

15. An elongated rotary cutting tool defining a central longitudinal axis (A-A), comprising:
    a shank portion; and
    a cutting portion adjoining the shank portion, the cutting portion having a cutting end and a first blade, the first blade having an end cutting edge, a peripheral cutting edge and a complex clearance surface adjacent the peripheral cutting edge,
    wherein the complex clearance surface reduces vibration or chatter in the rotary cutting tool,
    wherein the peripheral cutting edge is continuously smooth and uninterrupted, and
    wherein the first blade defines a rounded corner cutting edge connecting the end cutting edge and the peripheral cutting edge, the rounded corner cutting edge defining a rounded corner radius.

16. An elongated rotary cutting tool defining a central longitudinal axis (A-A), comprising:
    a shank portion; and
    a cutting portion adjoining the shank portion, the cutting portion having a cutting end and a first blade, the first blade having an end cutting edge, a peripheral cutting edge and a complex clearance surface adjacent the peripheral cutting edge,
    wherein the complex clearance surface:
        reduces vibration or chatter in the rotary cutting tool, and
        is eccentric or convex, and
    wherein the peripheral cutting edge is continuously smooth and uninterrupted.

* * * * *